US011725555B1

(12) United States Patent
Ratts et al.

(10) Patent No.: US 11,725,555 B1
(45) Date of Patent: Aug. 15, 2023

(54) AFTERTREATMENT SYSTEM

(71) Applicant: Caterpillar Inc., Peoria, IL (US)

(72) Inventors: Joshua L. Ratts, East Peoria, IL (US);
Hrishi Lalit Shah, Dunlap, IL (US);
Tyler V. Richards, Parker, CO (US);
Matthew Colin Mowers, Peoria, IL (US); Sowmya Nagesh, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/665,796

(22) Filed: Feb. 7, 2022

(51) Int. Cl.
*F01N 3/029* (2006.01)
*F01N 3/20* (2006.01)
*B01D 53/94* (2006.01)

(52) U.S. Cl.
CPC ....... *F01N 3/0293* (2013.01); *B01D 53/9418* (2013.01); *B01D 53/9431* (2013.01); *B01D 53/9495* (2013.01); *F01N 3/208* (2013.01); *F01N 3/206* (2013.01); *F01N 3/2066* (2013.01); *F01N 2560/026* (2013.01); *F01N 2610/1453* (2013.01); *F01N 2900/1402* (2013.01); *F01N 2900/1411* (2013.01); *F01N 2900/1602* (2013.01); *F01N 2900/1606* (2013.01); *F01N 2900/1621* (2013.01); *F01N 2900/1622* (2013.01)

(58) Field of Classification Search
CPC combination set(s) only.
See application file for complete search history.

(56) References Cited

U.S. PATENT DOCUMENTS 6,082,176 A 7/2000 Kondo et al.
6,635,161 B2 10/2003 Inagaki
(Continued)

FOREIGN PATENT DOCUMENTS

JP 11072478 3/1999
KR 101189247 10/2012

*Primary Examiner* — Binh Q Tran
(74) *Attorney, Agent, or Firm* — Schwegman Lundberg & Woessner, P.A.

(57) ABSTRACT

An aftertreatment system for a diesel engine may include a diesel particulate filter configured for placement in fluid communication with the diesel engine to receive an exhaust flow. The system may also include a selective catalytic reduction system configured for arrangement downstream of the diesel particulate filter and a $NO_x$ sensor configured to measure a $NO_x$ concentration in the exhaust flow entering the selective catalytic reduction system. The system may also include a controller configured to estimate a ratio of $NO_2$ to $NO_x$ downstream of the diesel particulate filter and based on a factor affecting the generation of $NO_2$ upstream of the selective catalytic reduction system. The controller may also be configured to adjust the measured $NO_x$ concentration based on the ratio to provide an estimated actual $NO_x$ concentration and dose diesel exhaust fuel into the exhaust flow based on the estimated actual $NO_x$ concentration.

20 Claims, 7 Drawing Sheets

(56) References Cited

U.S. PATENT DOCUMENTS

| | | | |
|---|---|---|---|
| 6,947,831 B2 | 9/2005 | Van | |
| 8,883,102 B1* | 11/2014 | Lambert | B01D 53/9427 |
| | | | 60/299 |
| 9,482,136 B2 | 11/2016 | Ancimer et al. | |
| 10,690,033 B1* | 6/2020 | Johnson | F01N 3/035 |
| 10,927,773 B2 | 2/2021 | Gieger | |
| 2015/0314239 A1* | 11/2015 | Kawaguchi | F01N 3/2006 |
| | | | 422/111 |
| 2016/0108791 A1* | 4/2016 | Charbonnel | F01N 3/208 |
| | | | 422/62 |
| 2016/0186629 A1* | 6/2016 | Osburn | G01M 15/102 |
| | | | 60/276 |
| 2018/0221820 A1* | 8/2018 | Nilsson | F01N 3/108 |
| 2019/0234278 A1* | 8/2019 | Qi | B01D 53/9477 |

* cited by examiner

|  |  | PREDICTED NOX | | | |
|---|---|---|---|---|---|
|  |  | 0.2 | 0.4 | 0.6 | 0.8 |
| ACTUAL NOX | 0.2 | 0.0% | 4.1% | 8.5% | 13.3% |
|  | 0.4 | -3.9% | 0.0% | 4.2% | 8.9% |
|  | 0.6 | -7.8% | -4.1% | 0.0% | 4.4% |
|  | 0.8 | -11.7% | -8.1% | -4.2% | 0.0% |

AFTERTREATMENT SYSTEM

TECHNICAL FIELD

The present application relates generally to exhaust treatment systems. More particularly, the present application relates to exhaust treatment or aftertreatment systems and methods relating to diesel engines. Still more particularly, the present application relates to particular approaches to combining various aftertreatment systems for capturing diesel particles and controlling nitrogen gas emissions.

BACKGROUND

Waterborne vessels and, in particular, large waterborne vessels are often powered by diesel engines. In some cases, the power from these diesel engines can be used for propulsion, but the power may also be converted to electricity to provide electric power to other aspects of the vessel.

Emission control regulations continue to evolve and become more stringent as environmental concerns over combustion engine emissions continue to increase. In some areas of the world, emission controls may be higher for waterborne vessels. For example, inland waterways in the European Union may require that exhaust or aftertreatment systems control the number of particles being emitted and/or the amount of nitrogen gases being emitted from engines greater than 300 kilowatts. Still other applications of diesel power may include emission restrictions relating to particle numbers and/or nitrogen gas emissions.

Korean Patent Application 20100116375 is directed toward a $NO_x$ sensor compensation method for exhaust gas. The method is provided to improve the purification efficiency of the $NO_x$ by spraying urea using an exactly estimated concentration of the $NO_x$.

Summary

In one or more embodiments, an aftertreatment system for a diesel engine may include a diesel particulate filter configured for placement in fluid communication with the diesel engine to receive an exhaust flow. The system may also include a selective catalytic reduction system configured for arrangement downstream of the diesel particulate filter and a $NO_x$ sensor configured to measure a $NO_x$ concentration in the exhaust flow entering the selective catalytic reduction system. The system may also include a controller configured to estimate a ratio of $NO_2$ to $NO_x$ downstream of the diesel particulate filter based on a factor affecting the generation of $NO_2$ upstream of the selective catalytic reduction system. The controller may also be configured to adjust the measured $NO_x$ concentration based on the ratio to provide an estimated actual $NO_x$ concentration and dose diesel exhaust fuel into the exhaust flow based on the estimated actual $NO_x$ concentration.

In one or more embodiments, a machine may include a body portion and a diesel engine arranged on the body and configured for providing motive power to the body. The machine may also include an aftertreatment system for the diesel engine including a diesel particulate filter in fluid communication with the diesel engine to receive an exhaust flow. The aftertreatment system may also include a selective catalytic reduction system arranged downstream of the diesel particulate filter and a $NO_x$ sensor configured to measure a $NO_x$ concentration in the exhaust flow entering the selective catalytic reduction system. The aftertreatment system may also include a controller configured to estimate a ratio of $NO_2$ to $NO_x$ downstream of the diesel particulate filter based on a factor affecting the generation of $NO_2$ upstream of the selective catalytic reduction system. The controller may also be configured to adjust the measured $NO_x$ concentration based on the ratio to provide an estimated actual $NO_x$ concentration and dose diesel exhaust fuel into the exhaust flow based on the estimated actual $NO_x$ concentration.

In one or more embodiments a method of aftertreatment of exhaust from a diesel engine may include receiving an exhaust flow into a diesel particulate filter and treating the exhaust flow to remove soot and ash. The method may also include passively regenerating the diesel particulate filter. The method may also include receiving the exhaust flow into a selective catalytic reduction system and treating the exhaust flow to reduce a $NO_x$ concentration in the exhaust flow. Treating the exhaust flow to reduce a $NO_x$ concentration may include estimating a ratio of $NO_2$ to $NO_x$ downstream of the diesel particulate filter and based on a factor affecting the generation of $NO_2$ upstream of the selective catalytic reduction system. The method may also include measuring a concentration of $NO_x$ in the exhaust flow entering the selective catalytic reduction system. The method may also include adjusting the measured $NO_x$ concentration based on the ratio to provide an estimated actual $NO_x$ concentration and dosing diesel exhaust fuel into the exhaust flow based on the estimated actual $NO_x$ concentration.

DETAILED DESCRIPTION

Figure 1:
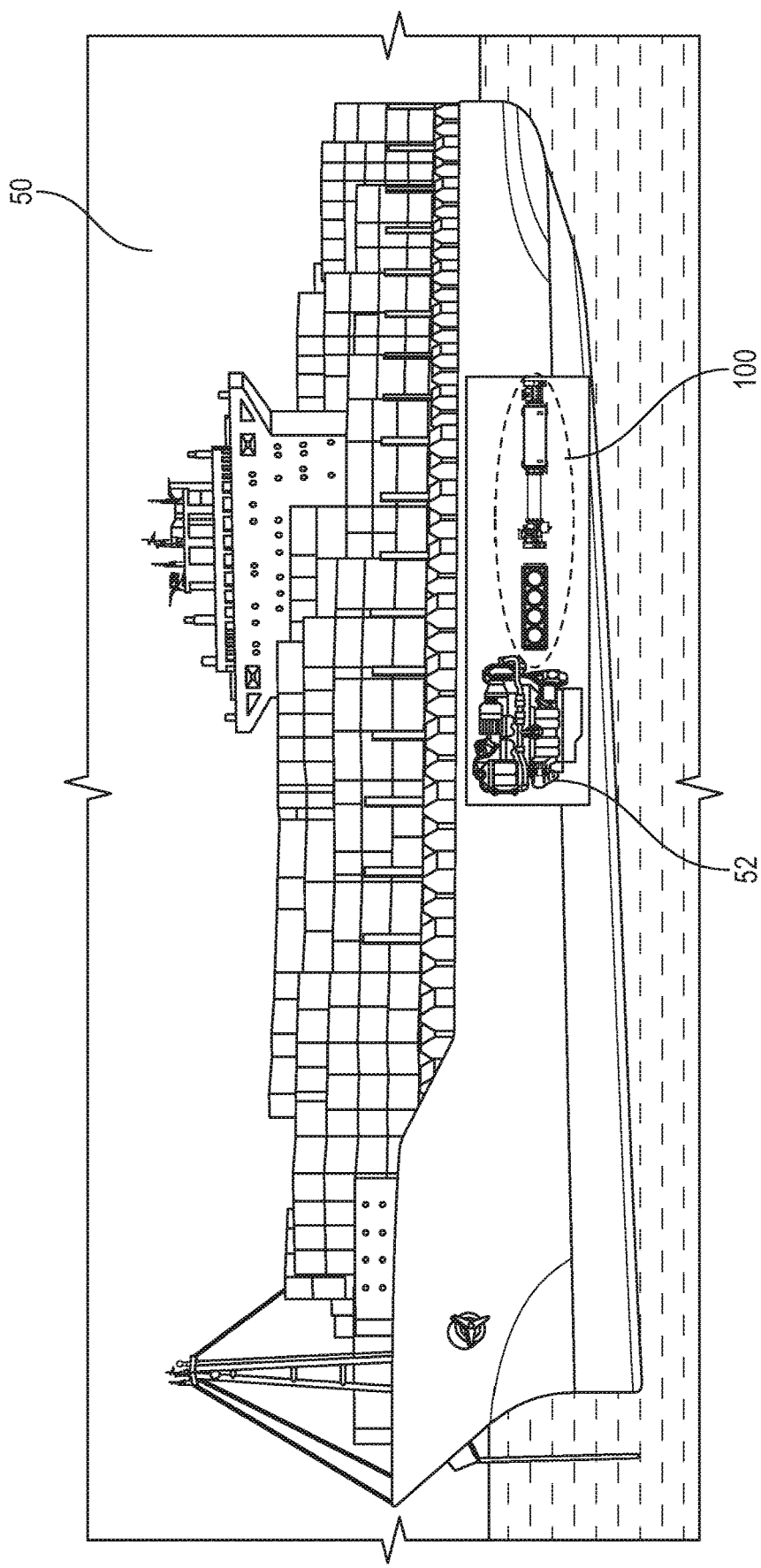
FIG. 1 is a perspective view of a machine and, in particular, waterborne vessel having a diesel engine and an aftertreatment system, according to one or more embodiments.

FIG. 1 is a side perspective view of a waterborne vessel 50. The vessel 50 may be a work vessel, cargo vessel, cruise vessel or other type of waterborne vessel. In one or more examples, the waterborne vessel 50 may be powered by one or more diesel engines 52, which may be adapted to provide propulsion and/or propulsion in combination with electrical generation. As shown, the diesel engine 52 may include an aftertreatment system 100 configured for treating the exhaust of the engine 52 prior to releasing the exhaust into the atmosphere. While the present application has been drafted in the context of waterborne vessel power, the aftertreatment system 100 described herein may be applicable for providing aftertreatment to any diesel-powered work machine or other diesel-powered equipment, automobile, or machine.

Figure 2:
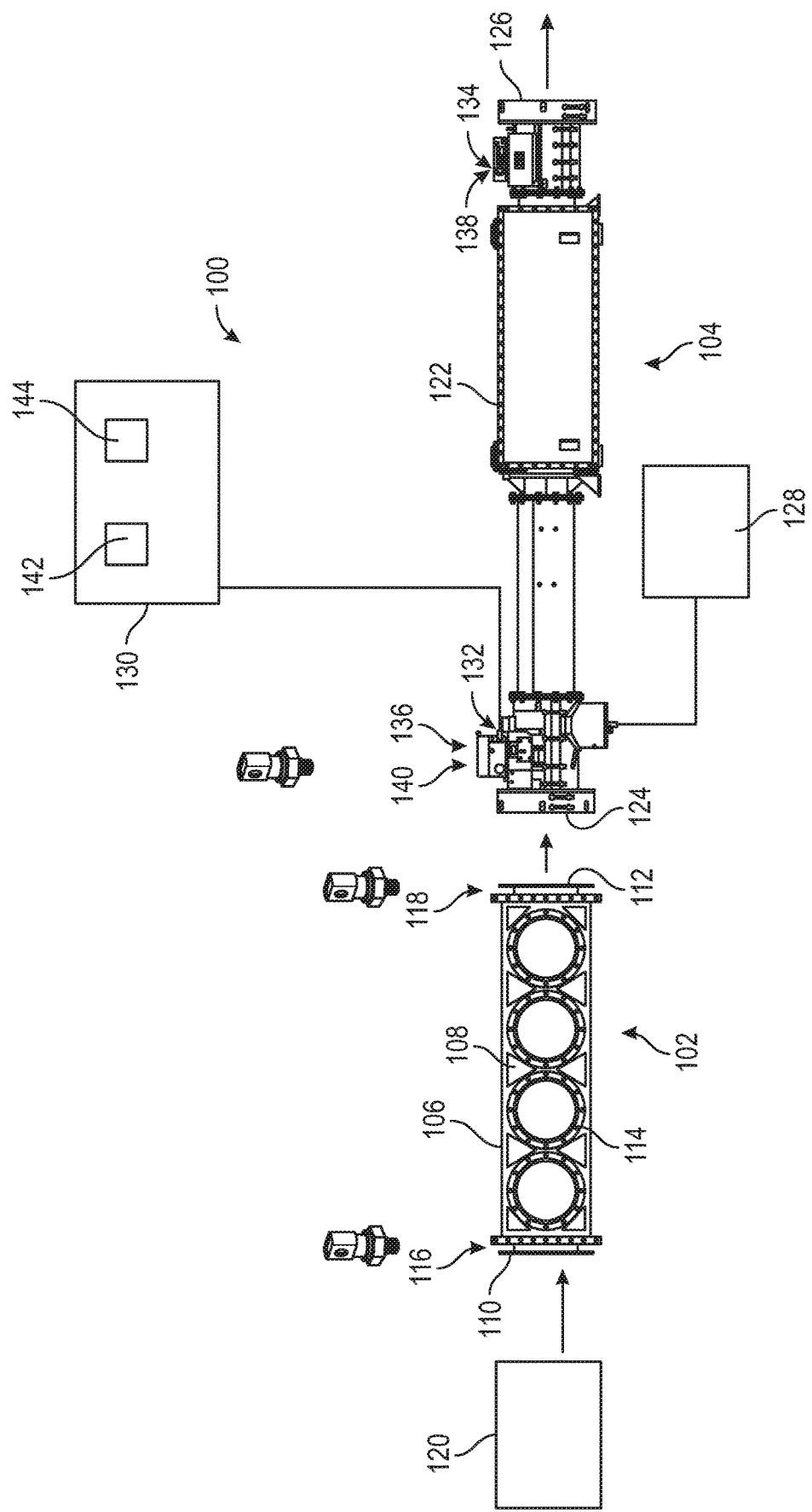
FIG. 2 is a side view of one example of an aftertreatment system, according to one or more examples.

Referring now to FIG. 2, a side view of an aftertreatment system 100 for a combustion engine is shown. The aftertreatment system 100 may be configured to reduce emissions from the combustion engine. In particular, the aftertreatment system 100 may be configured to control particle emissions and nitrogen gas emissions from a diesel engine 52. As shown, the system 100 may include a diesel particulate filter (DPF) 102 and a selective catalytic reduction (SCR) system 104. Moreover, the SCR 104 may be designed for operation apart from or in conjunction with the DPF 102 and systems and methods contained herein may be particularly suited for accommodating the addition of a DPF 102 to the SCR 104.

Beginning with the diesel particulate filter (DPF) 102, this device may be configured to filter out diesel particulate in an exhaust stream from the diesel engine 52. For example, the DPF 102 may be configured to filter out soot and ash from the exhaust stream. Moreover, the DPF 102 may be configured for ongoing (e.g., passive) regeneration. In one or more examples, the DPF 102 may include a housing 106 forming a cavity 108 and having an inlet 110 and outlet 112. The DPF 102 may also include a filtration system 114 within the housing (e.g., arranged in the cavity). The filtration system 114 may define one or more fluid pathways through the DPF 102 from the inlet 110 to the outlet 112. The filtration system 114 may include a filter media arranged across the one or more fluid pathways such that the exhaust gas from the diesel engine 52 passes through the filter media before exiting the DPF 102. In one or more examples, the filter system 114 may include a honeycomb structure having a portion of the honeycomb pathways plugged on an inlet side and a remaining portion of the honeycomb pathways plugged on an outlet side. This formation may cause exhaust gas from the engine 52 to enter the non-plugged honeycomb cavities on the inlet side, pass through the filter media into a neighboring cavity and exit the non-plugged honeycomb cavities on the outlet side. Still other approaches to defining a pathway and placing a filter media across the pathway may be provided including filter media folded in switchback fashion or other approaches to exposing the exhaust air to a relatively large surface area of filter media. In any case, the filter media may have a porosity selected to allow exhaust gas through the filter media while preventing passage of ash and soot. For purposes of identifying situations when the DPF 102 has been bypassed, removed, or otherwise rendered non-operating, the DPF 102 may also include first and second pressure sensors 116/118 at the inlet/outlet of the DPF 102, respectively. The sensors 116/118 may be absolute pressure sensors and may be configured for sensing respective pressures at the inlet/outlet 110/112 such that a differential pressure or pressure drop across the DPF may be calculated or determined and utilized to recognizing tampering as discussed in more detail below.

As mentioned, the DPF 102 may also be configured for ongoing (e.g., passive) regeneration. For example, in one or more examples a diesel oxidation catalyst (DOC) 120 may be provided upstream of the DPF. The DOC 120 may function to produce nitrogen dioxide ($NO_2$). For example, the DOC 120 may include an oxidation catalyst that functions to absorb oxygen from the exhaust gas providing an opportunity for other elements in the exhaust gas to react with the bonded oxygen. In particular, nitric oxide (NO) may react with the oxygen to form nitrogen dioxide ($NO_2$). When the nitrogen dioxide passes through the filtration media in the DPF 102, the nitrogen dioxide may react with the carbon in the soot to form carbon dioxide ($CO_2$), which may then pass through the filtration media. Alternatively or additionally, the DPF 102 may include a catalyst in the filter media, which may function to generate $NO_2$. The $NO_2$ generated in the filter media may back diffuse through the filter media and react with the soot to form $CO_2$, which may pass through the filter media and out of the DPF 102. In either case, some of the $NO_2$ generated either in the DOC 120 or within the filter media of the DPF 102 may not be fully absorbed or utilized in the regeneration process and, as such, the nitrogen oxide gases ($NO_x$) leaving the DPF 102 may be a combination of NO and $NO_2$. It to be appreciated that while the DOC 120 has been shown outside of the DPF, it may also be incorporated therein.

The selective catalytic reduction (SCR) system 104 may be arranged downstream of the DPF 102. The SCR 104 may be configured to reduce the amount of nitrogen oxide gas ($NO_x$) in the exhaust gas before it is released into the atmosphere at the tail pipe. In particular, the SCR 104 may function to react ammonia ($NH_3$) with $NO_x$ in the exhaust gas to produce nitrogen and water and, as such, reduce the emission of $NO_x$. The SCR 104 may include a housing 122 defining an internal cavity and having an inlet 124 and an outlet 126. The SCR 104 may have a diesel exhaust fluid (DEF) reservoir 128 in fluid communication with the cavity via a controllable valve or nozzle. In one or more examples, the DEF may be in fluid communication with the exhaust stream upstream of the SCR 104 and not directly in the cavity. The SCR 104 may also have a series of catalysts arranged within the cavity. For example, the SCR 104 may include a hydrolysis catalyst adapted to convert liquid urea to ammonia, for example. The SCR may also include an SCR catalyst to convert the ammonia and $NO_x$ to nitrogen and water. The SCR catalysts may include various porous ceramic materials with active catalytic components arranged on the ceramic material. For example, the SCR catalyst may include oxides of base metals such as vanadium, molybdenum, and tungsten, zeolites, or various precious metals may be used. Still other active catalytic components may be used. In one or more examples, the SCR 104 may also include an oxidation catalyst or an ammonia slip catalyst to address any remaining ammonia in the exhaust gas.

The SCR 104 may also include a controller 130 that controls the dosing of the DEF to suitably treat the amount of $NO_x$ in the exhaust gas. For this purpose, the SCR 104 may also include an inlet $NO_x$ sensor 132 and an outlet $NO_x$ sensor 134. Software may be present in the controller 130, which may calculate the amount of DEF dosing that is suitable to treat the amount of $NO_x$ in the exhaust stream. Based on these calculations, the software may function to control a dosing pump, valve, and/or nozzle, which may control a flow rate of DEF into the exhaust stream. This flow control may be an ongoing stream of DEF at a particular rate, a periodic dosing or spraying of the DEF into the SCR 104, or other method of controlling the volume and timing of the dosing of the DEF. In addition to the $NO_x$ sensors 132/134 mentioned, the SCR may also include a temperature sensor 136 arranged at or near the inlet. The temperature sensor 136 may, alternatively or additionally, be arranged on the outlet 112 of the DPF 102 or between the DPF 102 and the SCR 104. Still other locations for the temperature sensor 136 may be provided and additional temperature sensors such as temperature sensor 138 may be provided. Likewise, while the $NO_x$ sensors have been said to be located at the inlet and outlet of the SCR, still other or additional locations and/or additional sensors may be provided. Moreover, a pressure sensor 140 may be provided at or near the inlet 124 of the SCR 104 and/or at other locations on the SCR 104.

As mentioned above, the present SCR 104 may be configured for operation apart from a DPF 102 and/or together with a DPF 102. In the case where the SCR 104 is operated apart from a DPF 102, the inlet gases may come generally directly from the engine exhaust and the nitrogen gases ($NO_x$) in the exhaust gas may be primarily $NO_x$. However, in the case where the SCR 104 is operated together with a DPF 102 and, in particular, a DPF 102 having a diesel oxidation catalyst or internal catalyst that generates $NO_2$, the nitrogen gas in the outlet gas from the DPF 102 may include a combination of NO and $NO_2$. That is, as described above, the DPF 102 and/or DOC 120 may convert some of the NO from the engine exhaust to $NO_2$ to help treat soot. Unfortunately, the $NO_x$ sensor 132 on the inlet 124 of the SCR 104 may not accurately measure the amount of $NO_x$ in the gas stream where the $NO_x$ is a mixture of NO and $NO_2$. For example, while the NO concentration within the nitrogen gas may be accurately captured, the $NO_2$ concentration may register as approximately 80% of the actual concentration. So, for example, if the nitrogen gas portion of the exhaust stream leaving the DPF and entering the SCR has an actual concentration of 50% NO to 50% $NO_2$ and if the overall actual $NO_x$ concentration is 100 ppm, the $NO_x$ sensor on the inlet of the SCR 104 may reflect a reading of 90 ppm. That is, the sensor may account for 50 ppm $NO_x$ but only 80% of the 50 ppm of $NO_2$, or 40 ppm. Thus, the sensor would measure 50 ppm NO and 40 ppm $NO_2$, resulting in a measured $NO_x$ concentration of 90 ppm, when the actual concentration is 100 ppm.

Figures 3, 4:
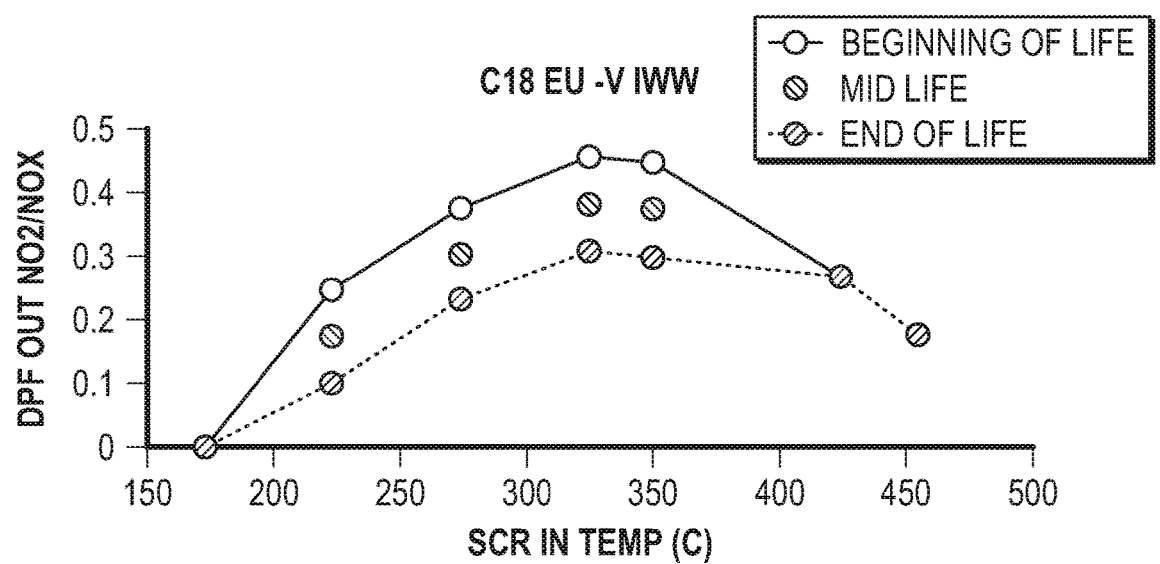
FIG. 3 is a table showing errors resulting from predicted $NO_x$ levels differing from actual $NO_x$ concentrations at various $NO_2/NO_x$ ratios.
FIG. 4 is a map of the ratio of $NO_2$ to $NO_x$ based on a factor of temperature and including a map for each of beginning of life, mid-life, and end of life for the diesel particulate filter, according to one or more examples.

This inaccuracy in the $NO_x$ value can affect the dosing of the SCR 104. For example, as shown in FIG. 3, if the inlet sensor suggests that the $NO_2/NO_x$ ratio is 0.8 and the actual concentration is 0.2, the error could be as high as 13.3% and the dosing of the SCR 104 would substantially overtreat the exhaust system wasting the DEF and potentially clogging the system. On the other end of the spectrum, if the $NO_2$ concentration is thought to be closer to 0.2 and the actual concentration is 0.8, the error could be as high as 11.7%. In this case, the SCR system 104 would substantially undertreat the exhaust gases resulting in high $NO_x$ emissions.

For this purpose, when the SCR 104 is used in conjunction with a DPF 102, the controller 130 may include an adjustment module 142 configured to adjust the $NO_x$ concentration measured by the inlet sensor 132 on the SCR 104 based on an estimate of the amount $NO_2$ that makes up the overall nitrogen gas portion of the exhaust stream entering the SCR 104. The estimate of the $NO_2$ component of the exhaust stream is discussed in more detail below. For now, assuming that an estimate of the amount of $NO_2$ contributing to the $NO_x$ concentration can be estimated as shown below, an adjustment calculation may calculate the estimated actual total $NO_x$ and may operate to properly dose the DEF in the SCR 104 and suitably treat the $NO_x$ in the exhaust to reduce the $NO_x$ emission.

Figure 5:
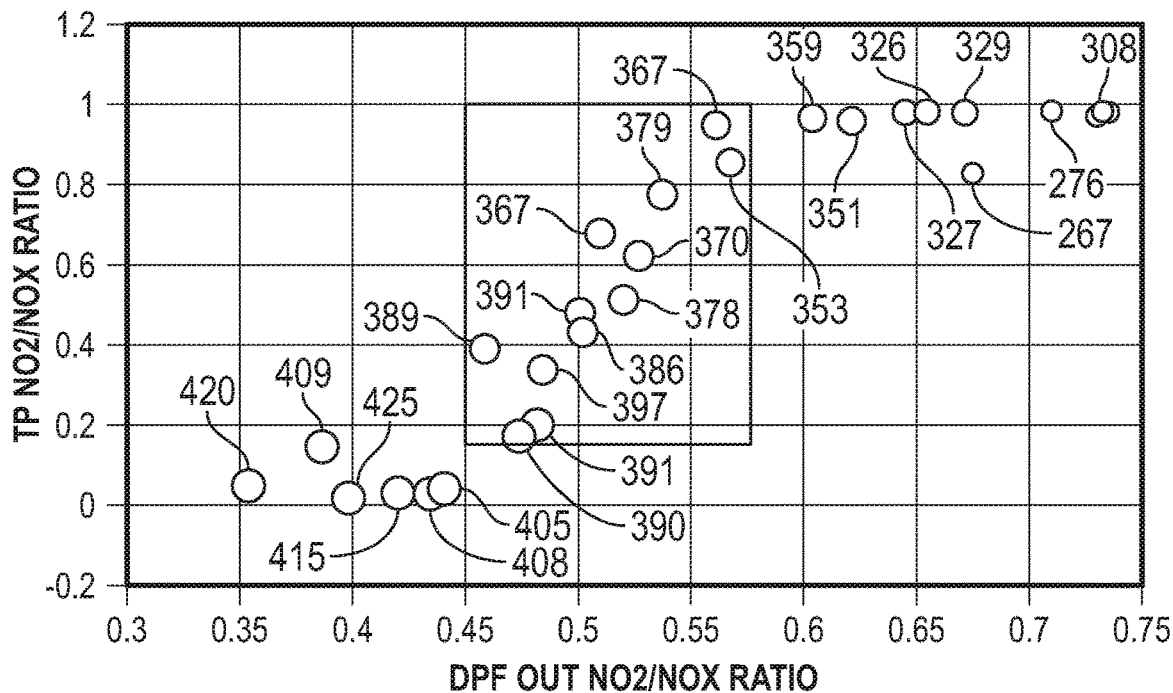
FIG. 5 is a diagram relating SCR inlet $NO_2$ concentrations to SCR tailpipe $NO_2$ concentrations, according to one or more embodiments.

Regarding the estimate of the $NO_2$ concentration, reference is made to FIGS. 4-5. The estimate of the $NO_2$ concentration in the exhaust gas exiting the DPF 102 and entering the SCR 104 may be based on one or more factors. That is, multiple aspects of the exhaust processing in the DPF 102 can affect the $NO_2$ concentration. For example, as shown in FIG. 4, temperature can affect the $NO_2$ concentration. As shown, and varying slightly based on the life of the DPF 102, an increase in temperature generally increases the amount of $NO_2$ exiting the DPF 102 and entering the SCR 104. For example, at temperatures ranging from approximately 175° C. to 325° C., the amount of $NO_2$ making up the overall $NO_x$ concentration may range relatively linearly from approximately 0 to approximately 0.3-0.45. Above 325° C., the portion of $NO_2$ making up the overall $NO_x$ concentration may begin to drop slightly to approximately 0.28 at 425° C. and 0.19 at 455° C. With a map such as that shown in FIG. 4, which depicts the effect of temperature on the amount of $NO_2$ exiting the DPF 102, the above-mentioned adjustment can be made to better estimate the total amount of $NO_x$ entering the SCR and, thus, provide for proper dosing of the DEF. To this end, and as mentioned with respect to FIG. 2, the inlet temperature sensor 136 on the SCR 104 may provide temperature information to the controller 130 allowing the controller 130 to utilize a map, such as that shown in FIG. 4, to estimate the $NO_2/NO_x$ ratio of the $NO_x$ entering the SCR 104 and adjust the measured $NO_x$ concentration accordingly. The controller 130 may then base the DEF dosing on the adjusted $NO_x$ concentration.

More specifically, the adjustment module 142 may rely on the following equations to adjust the measured $NO_x$ concentration. As mentioned, above, the relationship between the sensed $NO_x$ concentration and the actual concentration is defined as follows:

$$NO_{x_{sensor}} = NO_{Actual} + 0.8 * NO_{2_{Actual}} \qquad \text{Eq. 1}$$

The ratio of $NO_2/NO_x$ may be provided by a map such as that of FIG. 4 and may be reflected by the following equation:

$$\gamma(T) = \frac{NO_{2_{Actual}}}{NO_{x_{Actual}}} \qquad \text{Eq. 2}$$

Since $NO_x = NO + NO_2$, we can rewrite Eq. 2 as $$\gamma(T) = \frac{NO_{2_{Actual}}}{NO_{Actual} + NO_{2_{Actual}}} \qquad \text{Eq. 3}$$

By solving for $NO_2$ actual in Eq. 3, we get the following:

$$NO_{2_{Actual}} = \frac{\gamma}{1-\gamma} NO_{Actual} \qquad \text{Eq. 4}$$

Inputting Eq. 4 into equation 1 for $NO_2$ Actual, we get the following:

$$NO_{x_{sensor}} = NO_{Actual}\left(1 + \frac{0.8 * \gamma}{1 - \gamma}\right) \qquad \text{Eq. 5}$$

Solving for NO Actual in Eq. 5, we get the following:

$$NO_{Actual} = \frac{NO_{x_{sensor}}}{\left(1 + \frac{0.8 * \gamma}{1 - \gamma}\right)} \qquad \text{Eq. 6}$$

Now that we have calculated what NO Actual is, we can use Eq. 4 to calculate what $NO_2$ Actual is and by knowing what NO actual and $NO_2$ actual both are, we are able to calculate the $NO_x$ Actual. It is to be appreciated that various sensors may measure the amount of $NO_x$ in the exhaust gas differently and, as such, the 0.8 factor of Eq. 1 may be adjusted or selected depending on the senor used. Moreover, over time, the accuracy of the sensor may change and a trend may be predicted based on hours of use (e.g., age) of a particular sensor. Based on the predicted or known trend, the 0.8 factor or another factor suitable for a different sensor may be adjusted as the sensor ages.

While temperature has been discussed as affecting the $NO_2$ concentration exiting the DPF 102 and entering the SCR 104, several other factors may also affect the $NO_2$ concentration. For example, the soot loading within the DPF 102 at any given point in time may affect the $NO_2$ leaving the DPF 102. For example, if the soot loading is high, the DPF 102 may consume more $NO_2$ as the exhaust gas passes through the DPF 102. As such, all of the values in FIG. 4 may be lower at a same or similar temperature. Another factor affecting the $NO_2$ concentration may include the total mass exhaust flow. That is, as the mass of gas output of the engine 52 increases, the flow rates may be such that the diesel oxygen catalyst or the catalyst within the DPF 102 has less time per unit mass to produce $NO_2$ and, as such, may produce less $NO_2$ per unit mass. In this case, then, as total mass exhaust flow increases, the $NO_2$ concentration exiting the DPF 102 may decrease. So, and again, any given $NO_2$ value on the temperature chart may decrease at higher mass exhaust flows. Still another factor affecting the $NO_2$ concentration exiting the DPF 102 may include oxygen concentration in the exhaust. For example, at low workloads the oxygen concentration of the exhaust may be relatively high (e.g., 18-19%) because not as much oxygen is getting consumed by combustion within the engine. In contrast, when the engine is working harder, air may be drawn into the engine at very high rates to feed the combustion and the combustion rate may consume almost all of the oxygen drawn in such that oxygen concentration in the exhaust is relatively low (e.g., 2-4%). For purposes of $NO_2$, more oxygen generally provides for more $NO_2$ production in the diesel oxygen catalyst and/or in the DPF itself. In this case, then, the values of $NO_2$ on the temperature chart may increase for any given temperature. Likewise, the total amount of $NO_x$ coming out of the engine 52 after combustion may also affect the amount of $NO_2$ leaving the DPF 102. Like oxygen, a higher input of $NO_x$ into the DOC 120 and DPF 102 generally results in a higher $NO_2$. Accordingly, as $NO_x$ exiting the engine 52 increases, the $NO_2$ values on the temperature chart may increase. Still other factors may be taken into consideration and a variety of maps may be made that incorporate one or more of the above-listed factors. Moreover, while temperature has been described as a primary factor and all of the other factors have been described as being secondary to temperature, other factors may also be used individually or in combination with one another and with or without temperature.

Where combinations of factors are used, multiple maps may be created. For example, if a combination of soot loading and temperature were going to be used, several temperature maps at several soot loadings may be created and the adjustment factor may be based on interpolating between the several maps based on temperature and soot loading readings from sensors. Similarly, if oxygen concentration was included, yet another set of temperature maps at several combinations of soot loadings and oxygen content may be created. Still other combinations of factors and maps may be created to address a particular situation with a desired amount of precision. Also, respective sensors may be provided for the respective factors to capture the respective system measurements and provide them to the controller 130 for comparison to the map(s). For example, a soot loading sensor may be provided within the DPF. Alternatively or additionally, an exhaust flow sensor, an oxygen sensor, and/or an $NO_x$ sensor may be provided upstream of the DPF 102. Still other sensors and other factors may be provided.

In one or more examples, the DOC 120 or the catalyst in the DPF filter media may be sized and/or designed to maintain the $NO_2$ levels such that the $NO_2$ concentration exiting the DPF 102 remains below 50% of the total $NO_x$ concentration. That is, as shown in FIG. 5, the amount of $NO_2$ that is present at the tail pipe remains generally low (e.g., ~0) as the ratio of $NO_2$ to $NO_x$ entering the SCR 104 remains below 0.45. However, as the ratio of $NO_2$ entering the SCR approaches 0.5 and exceeds 0.5, then the ratio of $NO_2$ to $NO_x$ exiting the system 100 at the tail pipe jumps very quickly to 1.0, meaning almost all of the $NO_x$ emission is $NO_2$. As a result of this, and in effort to better control $NO_2$ emission, the DOC 120 and DPF 102 may be sized and calibrated to target an $NO_2$ concentration exiting the DPF to be at or below about 0.5 of the total $NO_x$ concentration. That is, adjustment of the tailpipe $NO_x$ measurement may be avoided as long as the $NO_2/NO_x$ ratio exiting the DPF remains below about 0.5. That being said, if the $NO_2/NO_x$ ratio exiting the DPF and entering the SCR approaches and/or exceeds about 0.5, then the relationship shown in FIG. 5 may be used to estimate the $NO_2/NO_x$ ratio at the tailpipe and the sensor reading at the tailpipe may be adjusted the same way the sensor reading at the exit of the DPF is adjusted (e.g., Eqs. 1-6).

Figure 7:
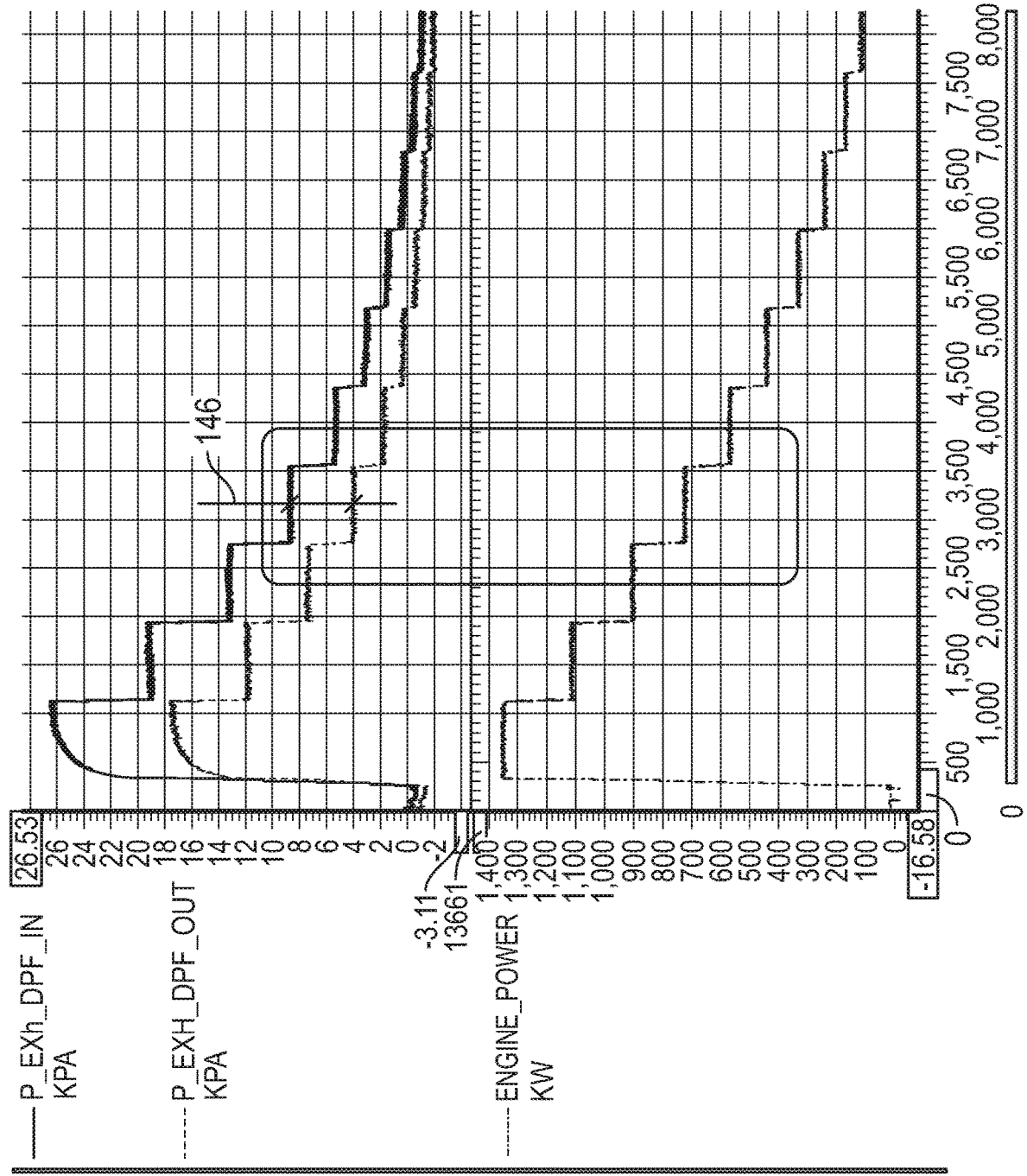
FIG. 7 is a diagram of differential pressure in conjunction with engine output power, according to one or more examples.

In one or more examples, the system 100 may include a DPF tamper control system 144. That is, for example, the controller 130 may be configured to determine whether the DPF 102 is present and/or operational (e.g., not bypassed). As mentioned with respect to FIG. 2, the DPF 102 may include a pressure sensor 116 at the inlet and a pressure sensor 118 at the outlet. In one or more examples, the sensors 116/118 may be absolute pressure sensors and the controller 130 may be configured to calculate a differential pressure by subtracting the pressure at the inlet 110 from the pressure at the outlet 112 or otherwise determining the absolute value of the difference between the two sensors 116/118. As shown in FIG. 7, the differential pressure between the two sensors 116/118 may vary depending on engine power output. Accordingly, the controller 130 may consider the power output at the time of capturing the pressure sensor values and may establish a target differential pressure 146 based on the power output. For example, where the power output is approximately 750 kW, a target pressure differential ranging from approximately 3-6 kPa or from approximately 4-5 kPa, or a pressure differential of 4.5 kPA may be defined as the target pressure differential. The controller 130 may calculate the differential pressure based on the difference between the DPF inlet and outlet sensors 116/118 and if the calculated differential pressure is within the target range 146, the DPF 102 may be confirmed as being present and operational. However, if the differential pressure is not present or falls outside the target range 146, the DPF 102 may be deemed not present or not operational and an error, warning, or lockout procedure may be performed by the controller 130.

Figure 6:
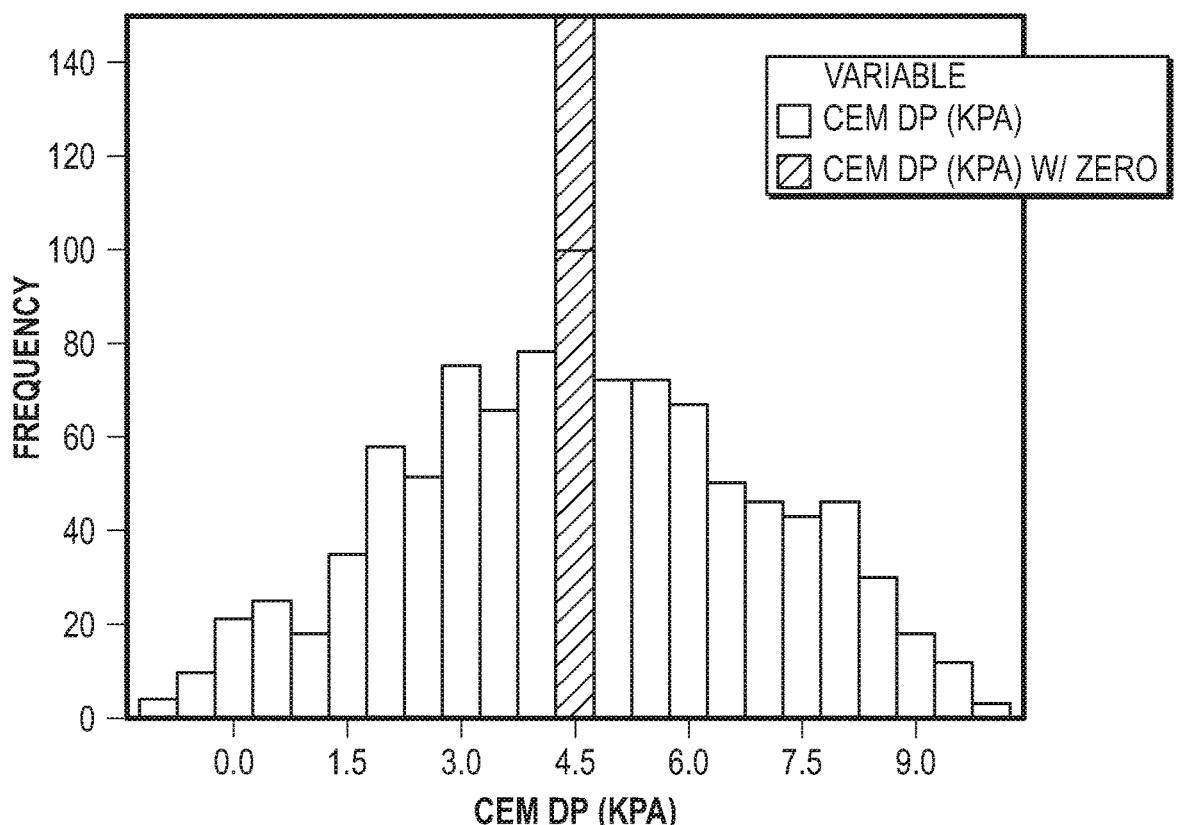
FIG. 6 is a diagram showing a distribution of pressure differential measurements across a diesel particulate filter where the sensors have an error of approximately 3 kPA and showing the effect of frequently zeroing the sensors.

In one or more examples, the pressure sensors 116/118 at the inlet 110 and outlet 112 may have a potential error over time ranging from approximately 0-3 kPA. As shown in FIG. 6, given the relatively low differential pressure across the DPF 102, this error may have a risk of cause false triggering of a missing or not operating DPF 102. In an effort to minimize or reduce this error, the system 100 may zero out the sensors on start up or another periodic, but relatively frequent timeframe. This may cause the sensed values to be generally inaccurate as to true pressure since a zero reading will match the system pressures when the equipment starts up. However, since the desired value is a differential pressure across the DPF 102, the difference in pressure will still be accurate. That is, where the absolute pressure at the inlet is 8.5 kPA and the absolute pressure at the outlet is 4 kPA, the pressure drop across the DPF 102 may be approximately 4.5 kPA. In this circumstance, the zeroed out sensors may read 4.5 kPA at the inlet 110 and 0 kPA at the outlet 112, which are not actually accurate, but still result in a calculated pressure drop of 4.5 kPA. As shown in FIG. 6, the zeroing out process may eliminate the risk of falsely triggering a missing or non-operating DPF 102. That is, the zeroing out process may change the distribution of differential pressure results to 4.5 kPA rather than a more bell-shaped curve of differential pressure results by eliminating or reducing the accumulating error of the sensors. This may help avoid falsely triggering a missing or non-operating DPF 102.

Figure 8:
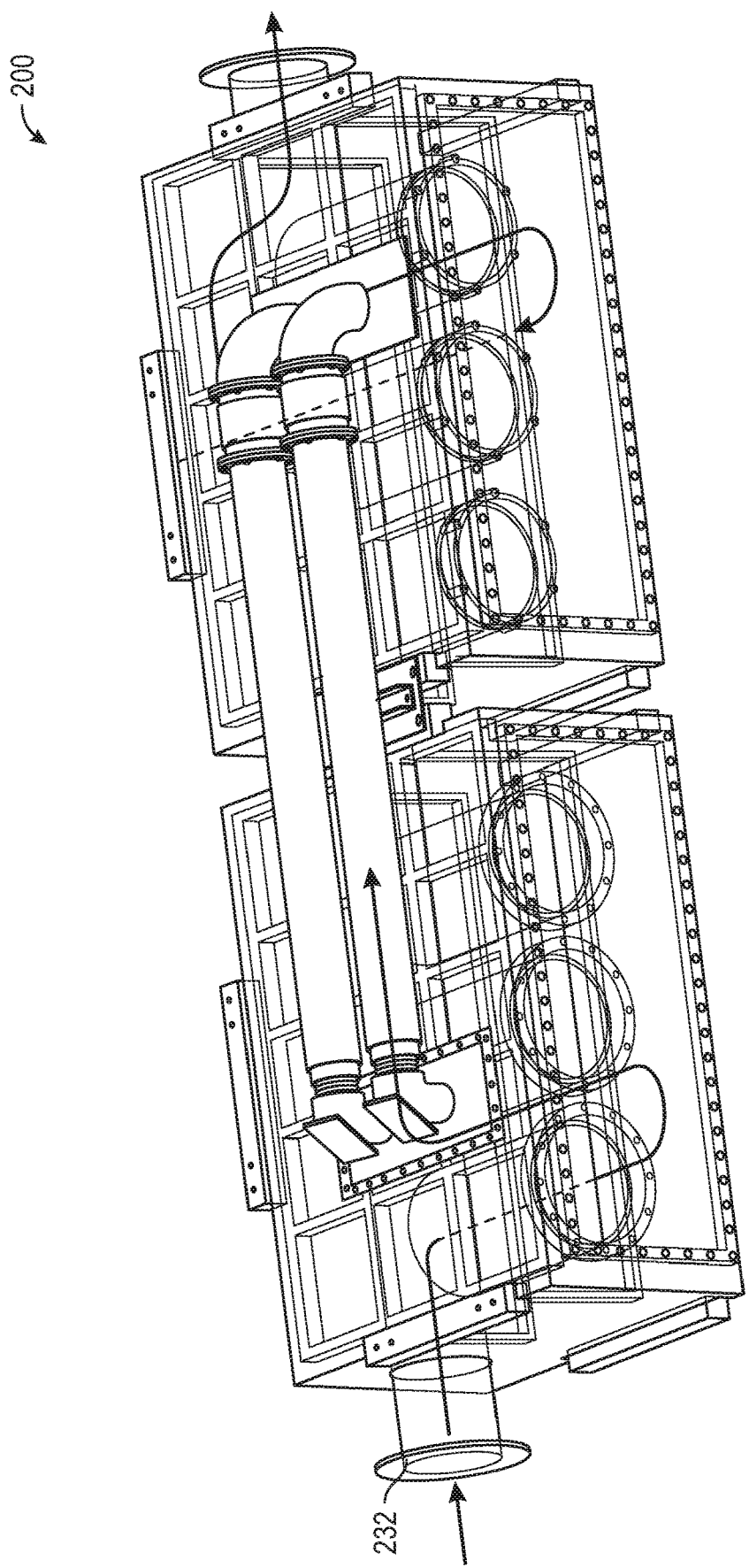
FIG. 8 is a diagram of another embodiment of a diesel particulate filter and a selective catalytic reduction system, according to one or more examples.

FIG. 8 shows another embodiment of an aftertreatment system 200. In this embodiment, the $NO_x$ sensor 232 may be arranged upstream of the DPF and closer to the engine out location. In this position, the concentration of $NO_x$ may be primarily NO and, as such, the $NO_x$ sensor may be generally accurate. Accordingly, the controller in this embodiment may perform dosing operations on the SCR based on the sensor reading without adjusting the sensor reading. However, like the examples discussed above, if the $NO_2/NO_x$ ratio entering the SCR is approaching or exceeding 0.5, then FIG. 5 may be used to estimate the tailpipe ratio and the sensor adjustment discussed above (e.g., Eqs. 1-6) may be used to adjust the $NO_x$ sensor at the tailpipe to determine the actual $NO_x$ in the tailpipe emission. Still further, like the embodiment of FIG. 2, the present embodiment may include pressure sensors on the inlet and outlet of the DPF and may perform tampering checks in a manner that is the same or similar to the system shown and described with respect to FIGS. 2, 6, and 7.

INDUSTRIAL APPLICABILITY

Figure 9:
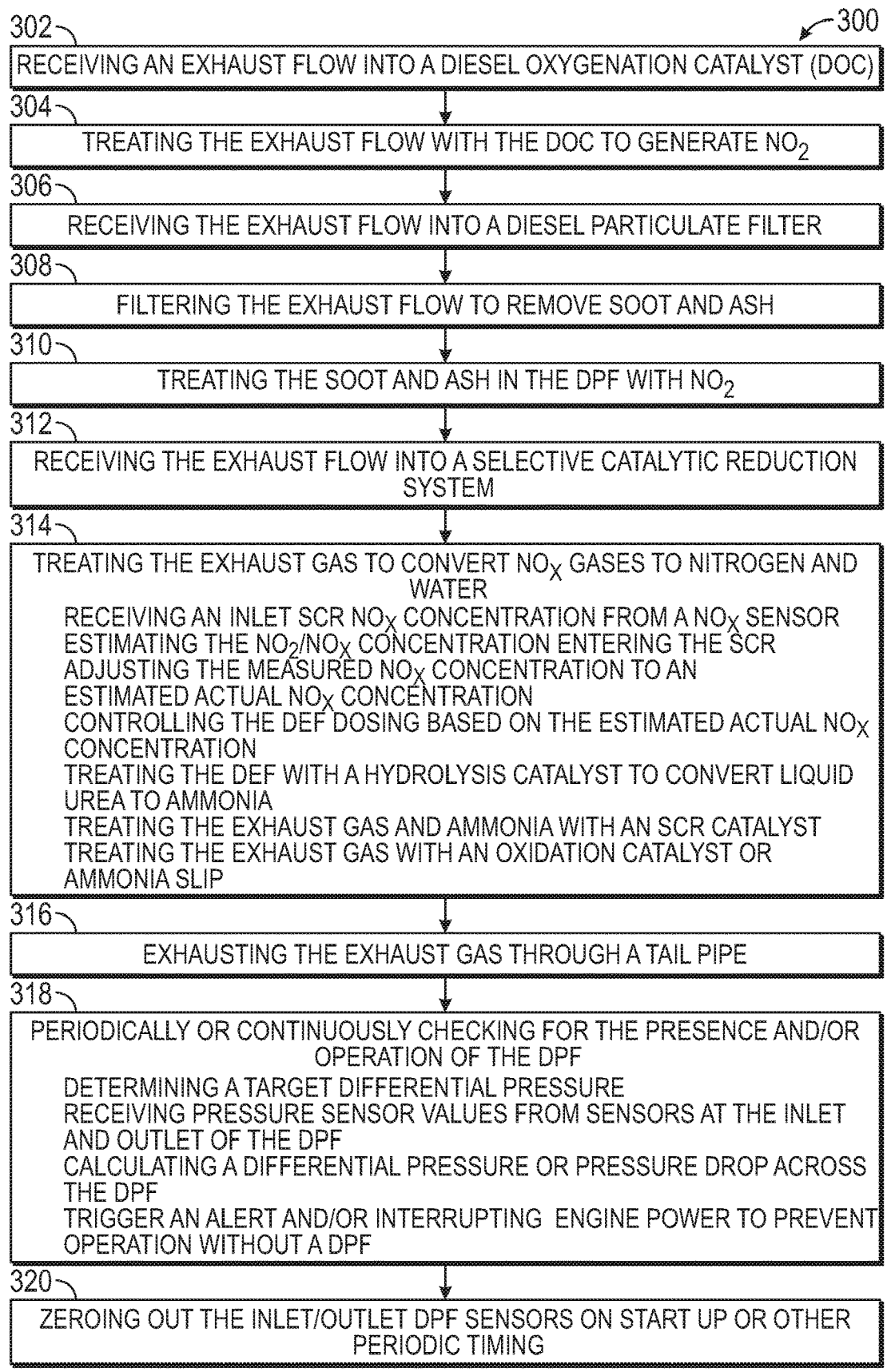
FIG. 9 is a diagram depicting a method of operation of an aftertreatment system, according to one or more embodiments.

In operation and use, and as shown in FIG. 9, a method 300 of aftertreatment of diesel exhaust may be provided. As shown, the method may include receiving an exhaust flow into a diesel oxygenation catalyst (DOC) 302 and treating the exhaust flow with the DOC to generate $NO_2$ 304. The method may also include receiving the exhaust flow into a diesel particulate filter 306 and filtering the exhaust flow to remove soot and ash 308. This aspect of the process may also include treating the soot and ash in the DPF with $NO_2$ 310 to generate carbon dioxide and, as such, passively regenerate the DPF. It is to be appreciated that where a DOC is not provided or in addition to the DOC, a catalyst may be provided on the filter media of the DPF for generating $NO_2$ and treating the soot and ash. The method may also include receiving the exhaust flow into a selective catalytic reduction system 312 and treating the exhaust gas to convert $NO_x$ gases to nitrogen and water 314. In one or more examples, treating the exhaust gas may include injecting, spraying, or otherwise dosing a diesel exhaust fuel (DEF) into the exhaust stream ahead of the SCR or within the SCR. The dosing of the DEF may be controlled by the controller and the method may include receiving an inlet SCR $NO_x$ concentration from a $NO_x$ sensor. The method may also include estimating the $NO_2/NO_x$ concentration entering the SCR based on one or more factors including temperature, soot loading, total mass exhaust flow, oxygen concentration, and/or $NO_x$ concentration. The method may also include adjusting the measured inlet SCR $NO_x$ concentration based on the estimated $NO_2/NO_x$ concentration to arrive at an estimated actual $NO_x$ concentration at the SCR inlet. The method may also include basing the DEF dosing on the estimated actual $NO_x$ concentration at the SCR inlet. Treating the exhaust gas may also include treating the DEF with a hydrolysis catalyst to convert liquid urea to ammonia, for example. Treating the exhaust gas may also include treating the exhaust gas and ammonia with an SCR catalyst such as those described above. Treating the exhaust gas may also include treating the exhaust gas with an oxidation catalyst or ammonia slip catalyst to address any remaining ammonia in the exhaust gas. The method may also include exhausting the exhaust gas through a tail pipe 316. In one or more examples, the method may also include periodically or continuously checking for the presence and/or operation of the DPF 318. This aspect of the method may include establishing or determining a target differential pressure across the DPF based on engine output at the time of capturing the pressure inputs at the inlet and output of the DPF. The method may also include receiving pressure readings from pressure sensors at the inlet and outlet of the DPF and calculating a differential pressure or pressure drop across the DPF. Where the pressure drop deviates from the target pressure drop, the system may trigger an alert and/or interrupt engine power to prevent operation without a DPF. In one or more examples, the method may include periodically zeroing out the inlet/outlet DPF sensors (e.g., on start up) to reduce and/or eliminate sensor errors that may have a tendency to falsely trigger a missing or non-operating DPF 320.

The above detailed description is intended to be illustrative, and not restrictive. The scope of the disclosure should, therefore, be determined with references to the appended claims, along with the full scope of equivalents to which such claims are entitled.

What is claimed is:

1. An aftertreatment system for a diesel engine, comprising:
   a diesel particulate filter configured for placement in fluid communication with the diesel engine to receive an exhaust flow;
   a selective catalytic reduction system configured for arrangement downstream of the diesel particulate filter;
   a $NO_x$ sensor configured to measure a $NO_x$ concentration in the exhaust flow entering the selective catalytic reduction system; and
   a controller configured to:
   estimate a ratio of $NO_2$ to $NO_x$ downstream of the diesel particulate filter based on a factor affecting the generation of $NO_2$ upstream of the selective catalytic reduction system;
   adjust the measured $NO_x$ concentration based on the ratio to provide an estimated actual $NO_x$ concentration; and
   dose diesel exhaust fuel into the exhaust flow based on the estimated actual $NO_x$ concentration.

2. The aftertreatment system of claim 1, wherein the factor comprises temperature of the exhaust flow in the diesel particulate filter.

3. The aftertreatment system of claim 1, wherein the factor comprises soot loading within the diesel particulate filter.

4. The aftertreatment system of claim 1, wherein the factor comprises a mass exhaust flow rate of the exhaust flow.

5. The aftertreatment system of claim 1, wherein the factor comprises oxygen concentration in the exhaust flow.

6. The aftertreatment system of claim 1, wherein the factor comprises $NO_x$ concentration in the exhaust flow.

7. The aftertreatment system of claim 1, wherein the controller includes a stored map reflecting a relationship between the factor and the ratio of $NO_2$ to $NO_x$.

8. The aftertreatment system of claim 1, wherein the factor comprises a combination of two or more of temperature, soot loading, mass exhaust flow rate, oxygen concentration, and $NO_x$ concentration.

9. The aftertreatment system of claim 8, wherein the controller includes a plurality of stored maps reflecting a plurality of relationships between the combination of factors and the ratio of $NO_2$ to $NO_x$.

10. The aftertreatment system of claim 9, wherein the controller is configured to interpolate between the plurality of stored maps when a measurement of one of the plurality of factors falls between available map values.

11. A machine, comprising:
a body portion;
a diesel engine arranged on the body and configured for providing motive power to the body; and
an aftertreatment system for the diesel engine, comprising:
a diesel particulate filter in fluid communication with the diesel engine to receive an exhaust flow;
a selective catalytic reduction system arranged downstream of the diesel particulate filter;
a $NO_x$ sensor configured to measure a $NO_x$ concentration in the exhaust flow entering the selective catalytic reduction system; and
a controller configured to:
estimate a ratio of $NO_2$ to $NO_x$ downstream of the diesel particulate filter based on a factor affecting the generation of $NO_2$ upstream of the selective catalytic reduction system;
adjust the measured $NO_x$ concentration based on the ratio to provide an estimated actual $NO_x$ concentration; and
dose diesel exhaust fuel into the exhaust flow based on the estimated actual $NO_x$ concentration.

12. The machine of claim 11, wherein the controller includes a stored map reflecting a relationship between the factor and the ratio of $NO_2$ to $NO_x$.

13. The machine of claim 11, wherein the factor comprises one or more of temperature, soot loading, mass exhaust flow rate, oxygen concentration, and $NO_x$ concentration.

14. The machine of claim 13, wherein the factor comprises two or more factors and the controller includes a plurality of stored maps reflecting a plurality of relationships between a combination of the two or more factors and the ratio of $NO_2$ to $NO_x$.

15. The machine of claim 14, wherein the controller is configured to interpolate between the plurality of stored maps when a measurement of one of the two or more factors falls between available map values.

16. A method of aftertreatment of exhaust from a diesel engine, comprising:
receiving an exhaust flow into a diesel particulate filter and treating the exhaust flow to remove soot and ash;
passively regenerating the diesel particulate filter;
receiving the exhaust flow into a selective catalytic reduction system; and
treating the exhaust flow to reduce a $NO_x$ concentration in the exhaust flow, wherein treating the exhaust flow to reduce a $NO_x$ concentration comprises:
estimating a ratio of $NO_2$ to $NO_x$ downstream of the diesel particulate filter based on a factor affecting the generation of $NO_2$ upstream of the selective catalytic reduction system;
measuring a concentration of $NO_x$ in the exhaust flow entering the selective catalytic reduction system;
adjusting the measured $NO_x$ concentration based on the ratio to provide an estimated actual $NO_x$ concentration; and
dosing diesel exhaust fuel into the exhaust flow based on the estimated actual $NO_x$ concentration.

17. The method of claim 16, wherein the factor comprise temperature of the exhaust flow and the method further comprises sensing the temperature of the exhaust flow with a temperature sensor.

18. The method of claim 17, further comprising accessing a map correlating the ratio to temperature to estimate the ratio of $NO_2$ to $NO_x$ based on the sensed temperature.

19. The method of claim 18, wherein the factor further comprises soot loading within the diesel particulate filter and the method further comprises sensing a soot loading.

20. The method of claim 19, further comprising accessing a map correlating the ratio to temperature and soot loading to estimate the ratio of $NO_2$ to $NO_x$.

* * * * *